(12) United States Patent
Scalisi et al.

(10) Patent No.: US 11,531,823 B2
(45) Date of Patent: Dec. 20, 2022

(54) DIRECTED SOUND TRANSMISSION SYSTEMS AND METHODS

(71) Applicant: Zaps Labs Inc., Austin, TX (US)

(72) Inventors: Joseph Frank Scalisi, Lakeway, TX (US); Tyler James Gilbreth, Riverside, CA (US); Steven Christopher Lynch, San Juan Capistrano, CA (US); Adrian Simon Lanch, Lakeway, TX (US)

(73) Assignee: Zaps Labs, Inc., Austin, TX (US)

( * ) Notice: Subject to any disclaimer, the term of this patent is extended or adjusted under 35 U.S.C. 154(b) by 0 days.

(21) Appl. No.: 17/506,469

(22) Filed: Oct. 20, 2021

(65) Prior Publication Data

US 2022/0182757 A1 Jun. 9, 2022

Related U.S. Application Data

(60) Provisional application No. 63/121,851, filed on Dec. 4, 2020.

(51) Int. Cl.
*G06F 40/47* (2020.01)
*G10L 15/22* (2006.01)
(Continued)

(52) U.S. Cl.
CPC ............... *G06F 40/47* (2020.01); *G08B 5/38* (2013.01); *G10K 11/17815* (2018.01); *G10K 11/17873* (2018.01); *G10L 15/005* (2013.01); *G10L 15/183* (2013.01); *G10L 15/22* (2013.01); *G10L 25/51* (2013.01); *H04B 11/00* (2013.01); *H04R 1/025* (2013.01); *H04R 1/323* (2013.01); *H04R 1/403* (2013.01); *H04R 3/00* (2013.01); *H04R 3/12* (2013.01); *H04R 5/02* (2013.01); *G10K 2200/10* (2013.01); *G10K 2210/128* (2013.01); *G10K 2210/3027* (2013.01);
(Continued)

(58) Field of Classification Search
None
See application file for complete search history.

(56) References Cited

U.S. PATENT DOCUMENTS 4,315,514 A 2/1982 Drewes
4,823,908 A 4/1989 Tanaka
(Continued)

FOREIGN PATENT DOCUMENTS

WO 1983002718 A1 8/1983
WO 2003026343 A2 3/2003

OTHER PUBLICATIONS

Geyser, Werner—How Much do Spotify Ads Cost? | The Ultimate Guide to Advertising on Spotify—Influencer Marketing Hub—Available at least as of Dec. 2020—Available from Internet <URL: https://influencermarketinghub.com/spotify-ads-cost/>.
(Continued)

*Primary Examiner* — Kenny H Truong
(74) *Attorney, Agent, or Firm* — Gallium Law; Wesley Schwie, Esq.; Stanton Braden, Esq.

(57) ABSTRACT

Systems and methods are provided herein for directing sound through a parametric speaker in connection with interpreting/translating messages in an open forum such that communications may be delivered and understood without the use of headphones. The directed sound may also be directed in connection with detecting auditory areas and targeting sound at the auditory regions of a subject.

20 Claims, 7 Drawing Sheets

(51) Int. Cl.
- G10L 15/183 (2013.01)
- G10L 25/51 (2013.01)
- G10K 11/178 (2006.01)
- H04R 1/32 (2006.01)
- H04R 1/02 (2006.01)
- G08B 5/38 (2006.01)
- G10L 15/00 (2013.01)
- H04B 11/00 (2006.01)
- H04R 3/00 (2006.01)
- H04R 1/40 (2006.01)
- H04R 3/12 (2006.01)
- H04R 5/02 (2006.01)

(52) U.S. Cl.
CPC .. *G10K 2210/3044* (2013.01); *H04R 2203/12* (2013.01); *H04R 2217/03* (2013.01); *H04R 2499/13* (2013.01)

(56) References Cited

U.S. PATENT DOCUMENTS

| | | | |
|---|---|---|---|
| 4,827,520 | A | 5/1989 | Zeinstra |
| 5,680,468 | A | 10/1997 | Hout |
| 5,885,129 | A | 3/1999 | Norris |
| 6,055,478 | A | 4/2000 | Heron |
| 6,427,017 | B1 | 7/2002 | Toki |
| 6,631,196 | B1 | 10/2003 | Taenzer |
| 6,914,991 | B1 | 7/2005 | Pompei |
| 7,343,017 | B2 | 3/2008 | Norris |
| 7,440,578 | B2 | 10/2008 | Arai |
| 7,596,228 | B2 | 9/2009 | Pompei |
| 7,909,466 | B2 | 3/2011 | Fukui |
| 8,027,488 | B2 | 9/2011 | Pompei |
| 8,290,173 | B2 | 10/2012 | Richenstein |
| 8,369,546 | B2 | 2/2013 | Pompei |
| 8,879,766 | B1 | 11/2014 | Zhang |
| 8,958,580 | B2 | 2/2015 | Norris |
| 9,036,827 | B2 | 5/2015 | Pompei |
| 9,113,260 | B2 | 8/2015 | Norris |
| 9,319,802 | B2 | 4/2016 | Norris |
| 9,368,098 | B2 | 6/2016 | Kappus |
| 9,369,805 | B2 | 6/2016 | Wilson |
| 9,411,511 | B1 | 8/2016 | Sivertsen |
| 9,510,089 | B2 | 11/2016 | Norris |
| 9,532,153 | B2 | 12/2016 | Olsen |
| 9,820,055 | B2 | 11/2017 | Babayoff |
| 9,881,610 | B2 | 1/2018 | Connell |
| 10,150,425 | B1 | 12/2018 | Scalisi |
| 10,160,399 | B1 | 12/2018 | Scalisi |
| 10,187,724 | B2 | 1/2019 | Tsai |
| 10,591,869 | B2 | 3/2020 | Smalley |
| 2006/0290315 | A1 | 12/2006 | Hosoi |
| 2007/0183618 | A1 | 8/2007 | Ishii |
| 2008/0273711 | A1 | 11/2008 | Broussard |
| 2009/0116660 | A1 | 5/2009 | Croft |
| 2011/0033074 | A1 | 2/2011 | Chang |
| 2011/0261021 | A1 | 10/2011 | Modarres |
| 2013/0259254 | A1 | 10/2013 | Xiang |
| 2014/0072155 | A1 | 3/2014 | Norris |
| 2014/0104988 | A1 | 4/2014 | Norris |
| 2015/0007025 | A1 | 1/2015 | Sassi |
| 2015/0104026 | A1 | 4/2015 | Kappus |
| 2015/0104045 | A1 | 4/2015 | Norris |
| 2015/0104046 | A1 | 4/2015 | Norris |
| 2015/0105117 | A1* | 4/2015 | Larson ............... H04M 1/6066 455/518 |
| 2015/0110333 | A1 | 4/2015 | Norris |
| 2015/0382129 | A1* | 12/2015 | Florencio ............... H04R 5/04 381/303 |
| 2016/0336022 | A1 | 11/2016 | Florencio |
| 2017/0276764 | A1 | 9/2017 | Vilermo |
| 2018/0295462 | A1 | 10/2018 | Di Censo |
| 2019/0122691 | A1 | 4/2019 | Roy |
| 2020/0314536 | A1* | 10/2020 | Kobayashi ............ H04R 1/403 |

OTHER PUBLICATIONS

Jiang, Jingjing—More Americans are using ride-hailing apps—Pew Research Center—Jan. 4, 2019—Available from Internet <URL: https://www.pewresearch.org/fact-tank/2019/01/04/more-americans-are-using-ride-hailing-apps/>.

Audio Drom—What are Realistic Volume Levels?—Audio Drom—Oct. 18, 2014—Available from Internet <URL: http://www.audiodrom.net/en/as-we-see-it-tips-thoughts/74-realistic-volume-levels>.

Knowledge Sourcing Intelligence—Global Data Broker Market Size, Share, Opportunities And Trends—Knowledge Sourcing Intelligence—May 2020—Available from Internet <URL: https://www.knowledge-sourcing.com/report/global-data-broker-market>—Retrieved from Internet <URL: https://web.archive.org/web/20200806134723/https://www.knowledge-sourcing.com/report/global-data-broker-market>.

Kurz, Christopher; Li, Geng; Vine, Daniel—The Young and the Carless? The Demographics of New Vehicle Purchases—Federal Reserve FEDS Notes—Jun. 24, 2016—Available from Internet <URL: https://www.federalreserve.gov/econresdata/notes/feds-notes/2016/the-young-and-the-carless-the-demographics-of-new-vehicle-purchases-20160624.html>.

Mathews, T.J.; Hamilton, Brady E.—Mean Age of Mothers is on the Rise: United States, 2000-2014—NCHS Data Brief, No. 232—Jan, 2016—Available from Internet <URL: https://www.cdc.gov/nchs/data/databriefs/db232.pdf>.

Mazlan, R.; Saim, L.; Thomas, A.; Said R.; Liyab, B.—Ear Infection and Hearing Loss Amongst Headphone User—Malaysian Journal of Medical Sciences, vol. 9, No. 2, pp. 17-22—Jul. 2002—Available from Internet <URL: https://www.ncbi.nlm.nih.gov/pmc/articles/PMC3406203/pdf/mjms-9-2-017.pdf>.

McKinsey & Company—Monetizing car data—McKinsey & Company—Sep. 29, 2016—Available from Internet <URL: https://www.mckinsey.com/industries/automotive-and-assembly/our-insights/monetizing-car-data#>.

NIH—Listen Up!—NIDCD—Jun. 29, 2017—Available from Internet <URL: https://www.nidcd.nih.gov/listen-text-only-version>.

Power Digital—How to Advertise on Spotify—Power Digital—Mar. 2, 2018—Available from Internet <URL: https://powerdigitalmarketing.com/blog/how-to-advertise-on-spotify/#gref>.

Harman—ISZ Individual Sound Zones—Brochure—Available at least as of Dec. 2020—Available from Internet <URL: https://www.individualsoundzones.com/downloads/ISZ_Brochure.pdf>.

Sony—Vision S—Sony—Available at least as of Dec. 2020—Available from Internet <URL: https://www.sony.com/en/SonyInfo/vision-s/>.

Hyundai—Hyundai showcases next-generation Separated Sound Zone technology—Hyundai Newsroom—Aug. 14, 2018—Available from Internet <URL: https://www.hyundai.news/eu/articles/press-releases/hyundai-motor-company-showcases-next-generation-separated-sound-zone-technology.html>.

Norris, Woody—Woody Norris: Hypersonic sound and other inventions—TED Talks—YouTube video by user TED—Jan. 27, 2009—Available from Internet <URL: https://www.youtube.com/watch?v=HF9G9M0cR0E>.

Plesniak, Wendy; Pappu, Ravikanth—Coincident Display Using Haptics and Holographic Video—Proceedings of Conference on Human Factors in Computing Systems (CHI'98), ACM—Apr. 1998—Available from Internet <URL: https://www.media.mit.edu/spi/SPIPapers/wjp/chi98.pdf>.

Chang, Ji-Ho; Lee, Chan-Hui; Park, Jin-Young; Kim, Yang-Hann—A realization of sound focused personal audio system using acoustic contrast control—The Journal of the Acoustical Society of America vol. 125(4), pp. 2091-2097—May 2009—Available from Internet <URL: https://www.researchgate.net/publication/24264779_A_realization_of_sound_focused_personal_audio_system_using_acoustic_contrast_control>.

Lamancusa, J.S.—Vibrational Isolation—Noise Control—Penn State University—May 28, 2002—Available from Internet <URL: www.mne.psu.edu/lamancusa/me458/12_vibration.pdf>.

(56) References Cited

OTHER PUBLICATIONS

Perkins, Robert—Ultrasound Can Selectively Kill Cancer Cells—CalTech—California Institute of Technology—Feb. 4, 2020—Available from Internet <URL: https://www.caltech.edu/about/news/ultrasound-can-selectively-kill-cancer-cells>.

WatElectrical—What is Damping Ratio: Formula & Its Derivation—WatElectrical.com—Home—Electrical Machines—accessed Dec. 20, 2021—Available from the Internet <URL: https://watelectrical.com/damping-ratio/>.

Kingery, Ken—Sound Waves Could Provide New Tool to Fight Cancer—Pratt School of Engineering—Duke Cancer Institute—Jul. 3, 2018—Available from the Internet <URL: https://dukecancerinstitute.org/news/sound-waves-could-provide-new-tool-fight-cancer>.

Stevens, Alison Pearce—New ultrasound treatment kills off cancer cells—Science News for Students—Apr. 10, 2020—Available from the Internet <URL: https://www.sciencenewsforstudents.org/article/ultrasound-treatment-kills-cancer-cells>.

Mckie, Robin—High-power sound waves used to blast cancer cells—The Guardian—Oct. 31, 2015—Available from the Internet <URL: https://www.theguardian.com/science/2015/oct/31/ultrasound-cancer-research-hifu-bone-trial?CMP=Share_iOSApp_Other>.

Android Source—Multi-Zone Overview—Android Source—Available at least as of Oct. 28, 2020—Available from Internet <URL: https://source.android.com/devices/automotive/audio/multi_zone/overview>—Retrieved from Internet <URL: https://web.archive.org/web/20201130163810/https://source.android.com/devices/automotive/audio/multi_zone/overview>.

Baur, Francis X.—Attenuation Values of a Noise-Cancelling Headphone—Hearing Review—Jun. 3, 2008—Available from Internet <URL: https://www.hearingreview.com/hearing-products/attenuation-values-of-a-noise-cancelling-headphone>.

Corby, Stephen—How car audio is changing—Cars Guide—Aug. 21, 2020—Available from Internet <URL: https://www.carsguide.com.au/urban/last-mile/how-car-audio-is-changing-80278>.

Wadhwani, Preeti; Saha, Prasenjit—Automotive Speaker Market—Global Market Insights—May 2020—Available from Internet <URL: https://www.gminsights.com/industry-analysis/automotive-audio-system-market>—Retrieved from Internet <URL: https://web.archive.org/web/20200621021629/https://www.gminsights.com/industry-analysis/automotive-audio-system-market>.

American Friends of Tel Aviv University—Researchers destroy cancer cells with ultrasound treatment—Science Daily—Science News—Jun. 26, 2020—Available from Internet <URL: https://www.sciencedaily.com/releases/2020/06/200626141415.htm>.

Nindhia, Tjokorda—Damping Characteristics, Transmissibility, and Isolation Region of Aluminium and Gray Cast Iron Composite—Department of Mechanical Engineering, Udayana University—Jimbaran, Bali, Indonesia—Seminar Nasional Tahunan Teknik Mesin—SNTTM-VI—2007—Available from Internet <URL: http://prosiding.bkstm.org/prosiding/2007/TM-06.pdf>.

* cited by examiner

Figure 7

DIRECTED SOUND TRANSMISSION SYSTEMS AND METHODS

BACKGROUND

Field

Various embodiments disclosed herein relate to speakers. Certain embodiments relate to parametric speakers.

Description of Related Art

Communication in noisy environments has always been a challenge. In chambers such as the United Nations (UN), noise would be a problem but for the interpreters sending interpreted information through headsets to attendees. "Interpreting" is sometimes distinguished from "translating," as the former regards conveying the meaning of a spoken message from one language into another. At the same time, the latter may be defined as pertaining to the written word. There are six official languages for the UN: English, Spanish, French Russian, Chinese and Arabic. As interpreters often do not know all the official UN languages, sometimes interpreters must act in concert to relay messages to one another before delivering an interpreted message to a listener. The UN furnishes interpreters who work in booths to interpret speech into their native language from at least two other official languages. However, should a speaker not know one of the official languages, that speaker must bring their own interpreter to interpret a message into one of the official languages. A forum such as the UN may solve what would otherwise be one type of noise problem caused by many people speaking different languages at the same time. Alternatively, another type of problem may be caused by the general use of headsets, as headsets can present hearing damage. Further, headsets may block out sounds that one might want to hear (e.g., someone calling, alert noises, etc.).

In other environments such as an advertising forum, broadcast messages to customers or potential customers in that environment can produce unnecessarily loud noise levels, should several messages be broadcasted over various speakers simultaneously.

Loudness is measured in a unit defined as decibels (dB). Noises that are above 85 dB may cause hearing loss over time by damaging ear fibers. The ear can repair itself if exposed to noise below a certain regeneration threshold, but once permanent damage occurs and one's hearing is gone, ear fibers cannot be fixed, nor can a person gain their hearing back. Some examples that employ a safe hearing range include whispering and normal conversations around 30 dB and 60-80 dB, respectively. Unsafe zones include sporting events, rock concerts, and fireworks, around 94-110 dB, 95-115 dB, and 140-160 dB, respectively. Headphones fall into the range of 96-110 dB, placing them in the unsafe region. The ear should only be exposed to an intensity of 97 dB for about 3 hours per day, 105 dB for about 1 hour per day, or 110 dB for 30 minutes per day before causing ear damage.

As described, damage to the ear may occur when headphones deliver unsafe sound levels directly to the ear canal. This damage is directly related to how much that sound makes an eardrum vibrate. When using speakers, sound waves have to travel a few feet before reaching the listener's ears. This distance allows some of the higher frequency waves to attenuate. With headphones, the eardrum will be excited by all frequencies without attenuation, so headphones can be more damaging than speakers at the same volume. Additionally, many people are trying to produce acoustic isolation when using headphones, which requires higher volumes to drown out ambient noise. For this reason, headphone audio levels should be chosen cautiously so as not to cause permanent ear damage and hearing loss.

In addition to hearing loss, headphones can cause a ringing in one or both ears, known as tinnitus, pain in the ear, or eardrum. Other physical effects from headphone use include ear infections, characterized by swelling, reddening, and discharge in the ear canal, itching pain, and feelings of tenderness or fullness in the ear. Impacted wax (i.e., wax buildup) and aural hygiene problems may also result from headphone use. They can create a potential for bacteria to form in the ear canal due to increases in temperature and humidity of the ear canal. As a consequence of the above, communications involving headphones are far from ideal. Further, undirected sound produces unnecessary noise that interferes with the conveyance of information.

Parametric speakers provide directed sound over smaller wavelengths than most conventional systems, enabling a higher degree of directionality than other systems. Sound can be focused at a sufficient intensity to deliver a message that a specific receiver would understand. More specifically, parametric speakers provide a directed sound transmission system in connection with an ultrasonic transducer that modulates audio information on an ultrasonic carrier, producing a modulated carrier signal. A pressure wave may be made within a transmission medium according to the modulated carrier signal, which demodulates in connection with the pressure wave striking a surface. In some examples, a directed sound transmission system may serve as an apparatus for the directed transmission of sound waves restricted to a particular listener.

There is a need to implement parametric speaker technology and methods that better facilitate the safe conveyance of messaging over and above that presently used.

SUMMARY

In some embodiments, a method is provided for communications, the method pertaining to wirelessly receiving, via radio frequency signals, a message, containing audio information; demodulating the message; interpreting/translating the audio information from a first language to a second language; modulating the message on an ultrasonic carrier to produce a modulated ultrasonic carrier; and directing the modulated ultrasonic carrier, through a parametric speaker, to an intended receiver.

In some embodiments, wirelessly receiving and demodulating the message occurs at a mobile device.

In some embodiments, interpreting/translating audio information from a first language to a second language occurs before wirelessly receiving the message at a mobile device.

In some embodiments, interpreting/translating audio information from a first language to a second language occurs after wirelessly receiving the message.

In some embodiments, a method for communications is provided, including detecting a subject in an area; modulating a message on an ultrasonic carrier to produce a modulated ultrasonic carrier; and directing the modulated ultrasonic carrier, through a parametric speaker, to the subject.

In some embodiments, a method determines the height dimension of a subject relative to a floor, wherein a modulated ultrasonic carrier is directed at a region near the farthest extent of the height dimension from the floor.

In some embodiments, a system includes a parametric speaker; a modulator configured to modulate a message on an ultrasonic carrier resulting in a modulated ultrasonic carrier; a processor programmed to cause the parametric speaker to direct the modulated ultrasonic carrier to a subject, and a proximity detector configured to detect the subject.

In some embodiments, the proximity detector is activated in connection with activating a switch while the subject is within proximity to the parametric speaker system.

In some embodiments, a height detector for detecting a height dimension for the subject is provided in connection with directing a modulated ultrasonic carrier.

In some embodiments, the switch includes a subject-activated button.

In some embodiments, a memory is coupled to a processor.

In some embodiments, the parametric speaker system includes a demodulator.

In some embodiments, the demodulator is configured to demodulate a radio frequency modulated carrier signal.

In some embodiments, the proximity detector includes a camera.

In some embodiments, the processor forms part of a microcontroller.

In some embodiments, the processor forms part of a microcomputer.

In some embodiments, an interpreter/translator is configured to interpret/translate a message from a first language to a second language.

In some embodiments, a microphone is coupled to the parametric speaker system.

In some embodiments, a voice synthesizer is coupled to the parametric speaker system.

In some embodiments, a receiver is operable to receive wireless signals from the group consisting of radiofrequency (if) signals, infrared signals, microwave signals, and a combination thereof.

In some embodiments, a speaker system includes a receiver operable to receive wireless signals from the group consisting of radiofrequency (rf) signals, infrared signals, microwave signals, and a combination thereof; a demodulator, the demodulator being operable to demodulate the wireless signals to produce one or more audio messages; an ultrasonic modulator configured to modulate the one or more audio messages, and a parametric speaker configured to direct the one or more audio messages at a subject.

BRIEF DESCRIPTION OF THE DRAWINGS

Features, aspects, and advantages are described below with reference to the drawings, which are intended to illustrate, but not to limit, the invention. In the drawings, like reference characters denote corresponding features consistently throughout similar embodiments.

Reference numerals have been carried forward.

DETAILED DESCRIPTION

Although certain embodiments and examples are disclosed below, inventive subject matter extends beyond the specifically disclosed embodiments to other alternative embodiments and/or uses and modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order-dependent. Additionally, the structures, systems, and/or devices described herein may be embodied as integrated components or as separate components.

For purposes of comparing various embodiments, certain aspects and advantages of these embodiments are described. All such aspects or advantages are not necessarily achieved by any particular embodiment. For example, various embodiments may be carried out in a manner that achieves or optimizes one advantage or group of advantages as taught herein without necessarily achieving other aspects or advantages as may also be taught or suggested herein.

COMPONENT INDEX

100—meeting place
102—seating position
104—Parametric speaker
116—directed sound
201—attendee
202—seat
204—table
206—hand-held electronic device
404—Proximity detector
406—display stand
408—region
410—Sale items
411—floor
412—product information banner 412
416—button
418—microphone
502—head 502
518—controller
600—directed sound system
610—processor
612—memory
614—server
616—parametric speaker
620—transceiver
624—translation system
630—microphone system
702—start 704—message is provided step
706—message is processed step
710—end Given that entities at the UN generally address the forum via interpreters/translators, a software application for a processor programmed to interpret/translate languages from one language to another may be employed at each parametric speaker location, at the location of each party presenting or through a mobile device (e.g., smartphone, tablet, etc.) of each receiving location. Given the potential hearing damage associated with headphones, it may be advantageous to receive interpreted/translated communications without the need for headphones and in a manner that does not significantly increase ambient noise levels. In some embodiments, systems may implement speech synthesis to convey the interpreted/translated communications to the party intended for the communications.

Figure 1:
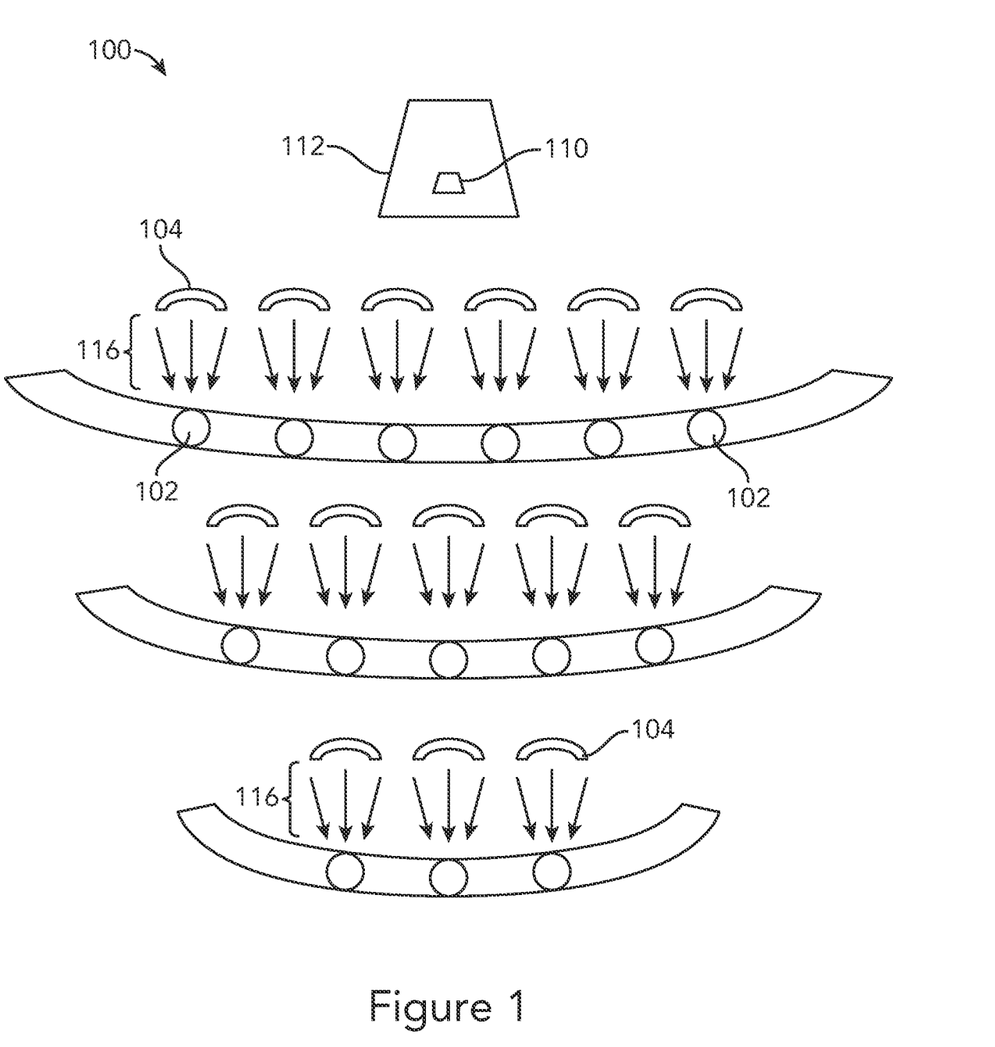
FIG. 1 illustrates a diagram representing a meeting place, employing the directed sound system according to the disclosure herein.

FIG. 1 illustrates a diagram representing meeting place 100, employing the directed sound system according to the disclosure herein. Meeting place 100 may be, for example, an assembly hall such as that found in the United Nations or a lecture hall for international students. Each attendee (not shown) may sit at one of the seating positions 102. Parametric speaker 104 near a respective seating position 102 may deliver directed sound to an attendee at each seating position. A person (not shown) standing at lectern 110 on platform 112 may deliver a speech interpreted by an electronic or living interpreter. A directed sound system, as disclosed herein, may provide directed sound 116 (shown as a group of three arrows) to each seating position 102 through a respective parametric speaker 104. Although seating positions are illustrated as circles in FIG. 1, not all are labeled for ease of illustration.

Similarly, not all parametric speakers or groups of three arrows (representing directed sound) are labeled. As used herein, parametric speaker 104 may be regarded as a parametric speaker system having functionality beyond that of solely a speaker. For instance, the parametric speaker may contain a full complement of communication software and hardware to enable remote communication and computer processing.

Figure 2:
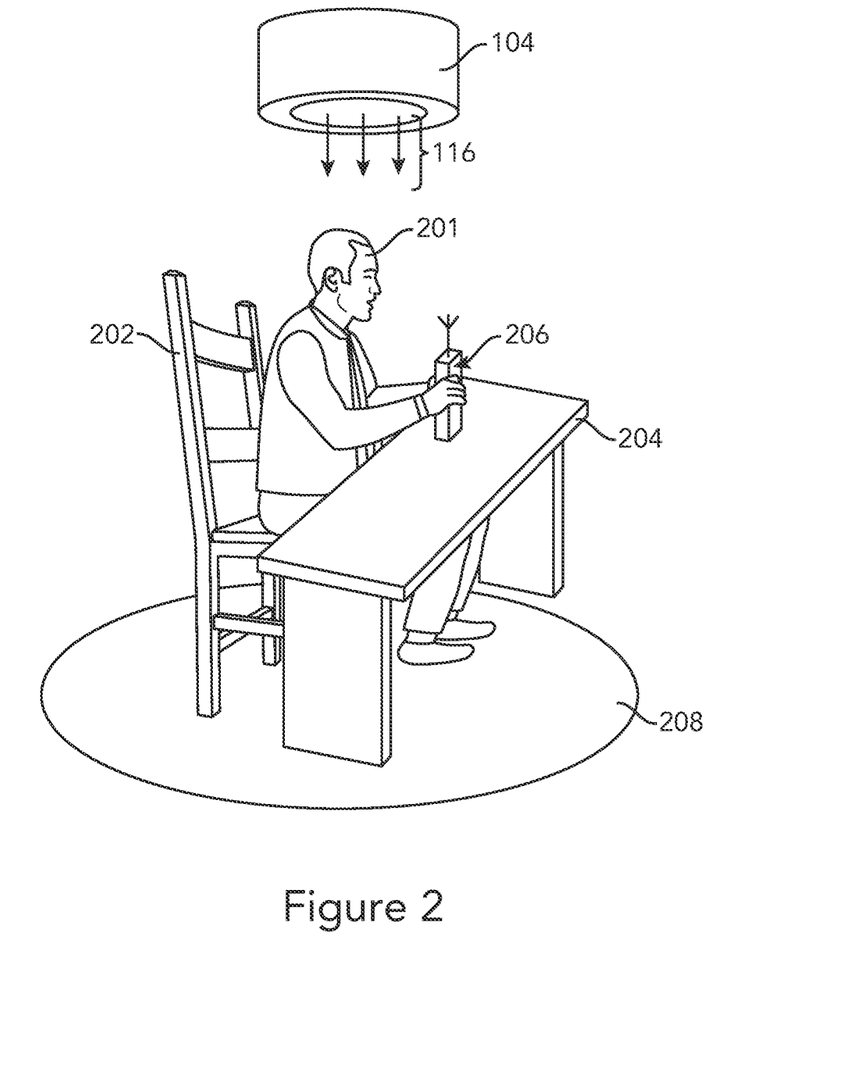
FIG. 2 illustrates a perspective view of an attendee sitting in a seat at a table while receiving sound from a parametric speaker positioned nearby.

FIG. 2 illustrates a perspective view of attendee 201 sitting in seat 202 at table 204, receiving sound from the parametric speaker 104 positioned nearby. In some embodiments, the parametric speaker 104 is positioned above attendee 201. While someone is delivering a speech in a foreign language, attendee 201 may have the option of interpreting that speech through an electronic or a living interpreter. The interpreted information in the preferred language of attendee 201 may be delivered via parametric speaker 104, overhead. The interpretation may be provided by a live interpreter associated with meeting place 100, who may send information to parametric speaker 104 over a wired or wireless connection. Alternatively, the interpretation may be provided by an electronic interpreter, which is communicatively coupled to parametric speaker 104. In some embodiments, the electronic interpreter may be integrated into equipment provided by meeting place 100. In other embodiments, the electronic interpreter may be coupled to parametric speaker 104. In other embodiments, an electronic interpreter may be part of a hand-held electronic device 206, such as a phone or tablet. Hand-held device 206 may be communicatively coupled to parametric speaker 104. For instance, hand-held device 206 may be electronically paired with an associated parametric speaker 104. Seat 202 may lie over a sound-absorbing region 208 to prevent sound reflections that may cause noise. Attendee 201 may hear interpreted speech without the use of headphones while still being able to hear potentially desirable ambient noises.

Figure 3:
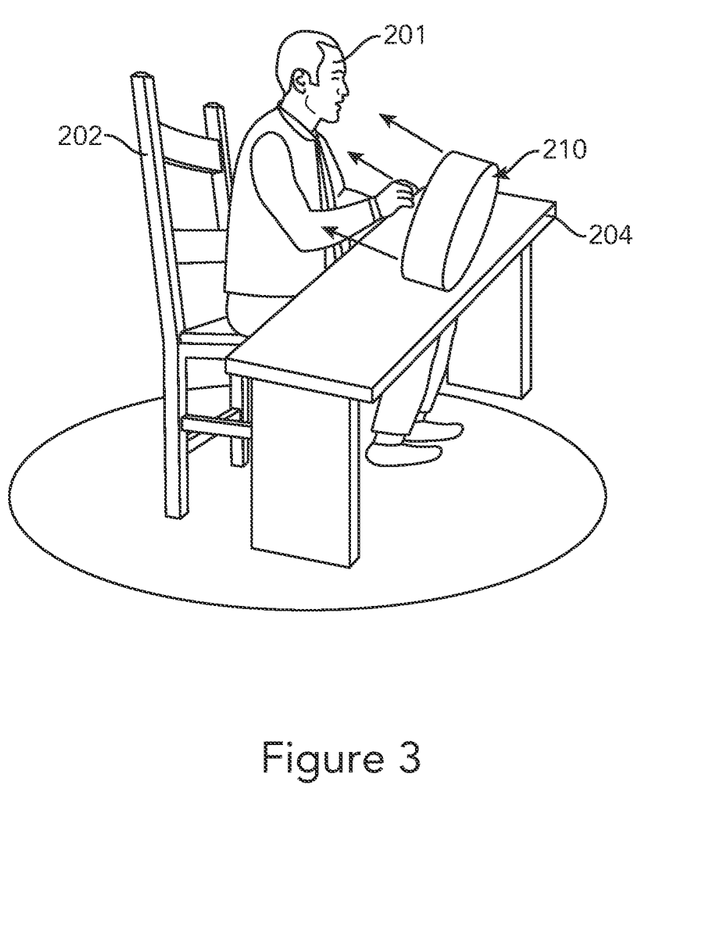
FIG. 3 is a perspective drawing illustrating another example of an attendee sitting at a table, receiving sound from a parametric speaker positioned nearby.

FIG. 3 is a perspective drawing illustrating another example of attendee 201 sitting in seat 202, at table 204, receiving sound from the parametric speaker 104 positioned nearby. Parametric speaker 104 is positioned on table 204 in front of attendee 201. While arrows representing directed sound are shown, they are not explicitly labeled 116 for each illustration.

Figure 4:
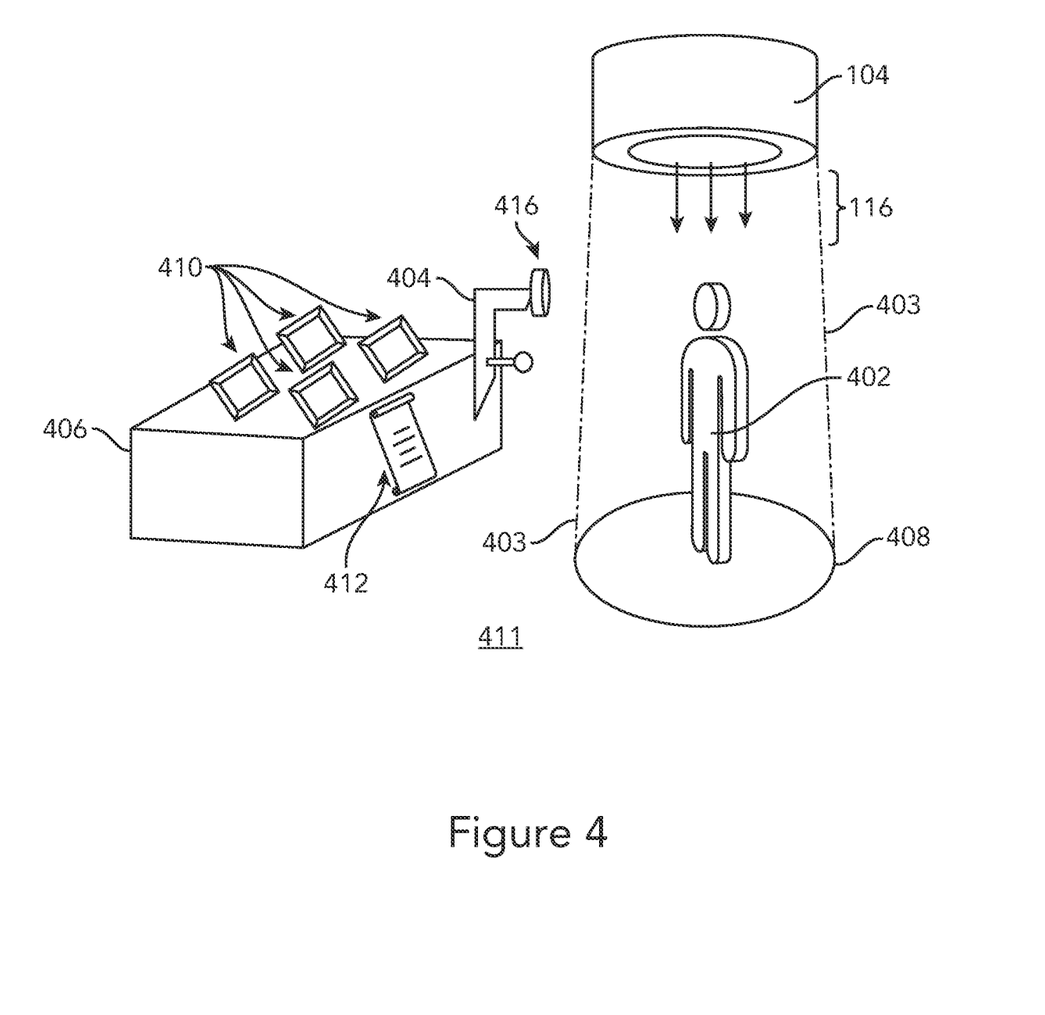
FIG. 4 illustrates a perspective drawing of a directed sound implementation in a commercial retail environment.

FIG. 4 illustrates a perspective drawing of a directed sound implementation in a commercial retail environment. Parametric speaker 104 is shown above patron 402. One or more colored lights (shown as dashed lines 403) may be emitted from a light source (not shown) coupled to parametric speaker 104, which may be used to guide patron 402 as to where to stand. Proximity detector 404 may detect the presence of patron 402 near display stand 406, which in response to the detection, a patron-directed message is sounded through parametric speaker 104. In some embodiments, a proximity detector may include a camera. However, other well-known artificial intelligence methods are contemplated for detecting patron 402 near display stand 406. Sale items 410 may be displayed on the display stand and other advertising indicia such as product information banner 412. Sound absorbing region 408 under parametric speaker 208 may be sound-absorbing to prevent sound reflections off floor 411. In some embodiments, region 408 may simply be a highlighted or colored region serving to designate where a patron 402 must stand to receive information directed from parametric speaker 104. In some embodiments, the parametric speaker may be activated in connection with patron 402 pressing button 416. Button 416 may be part of a multi-functional switch assembly (not shown). In other embodiments, microphone 418 may be provided for patron 402 to interactively communicate with store personnel (not shown) or artificial intelligence (AI devices in connection with directed sound from parametric speaker 104).

Figure 5:
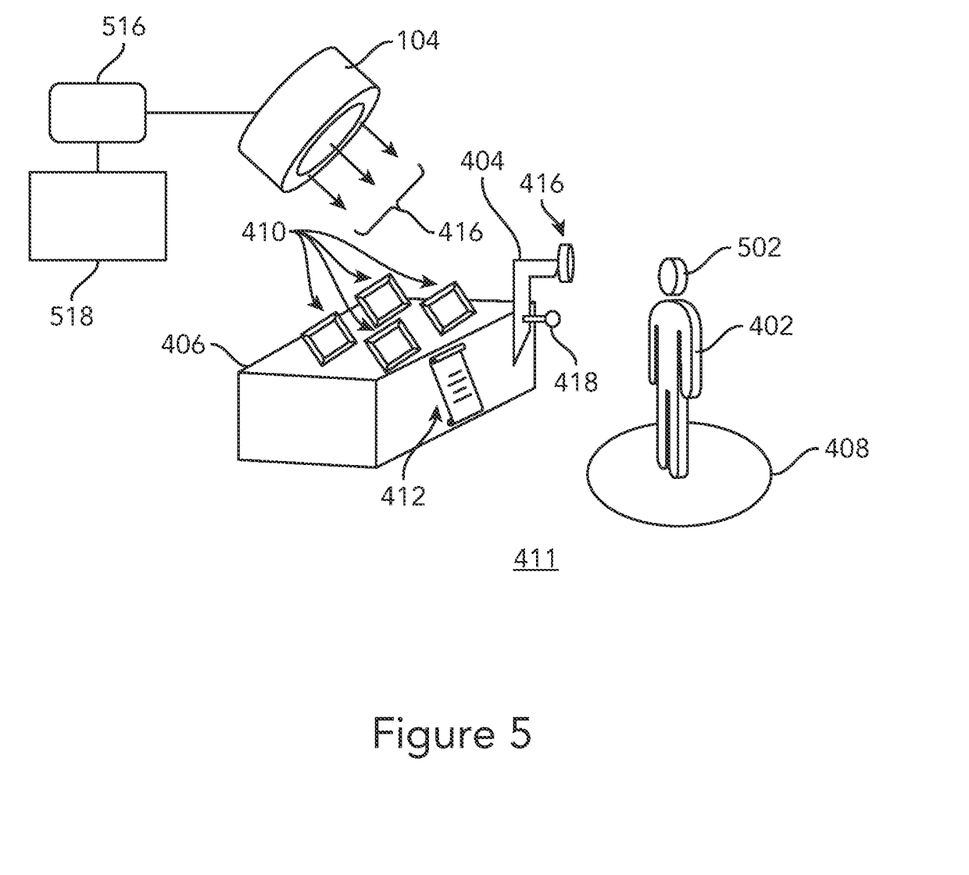
FIG. 5 illustrates a perspective drawing of a directed sound implementation in a commercial retail environment wherein the parametric speaker is positioned other than overhead with respect to patron 402.

FIG. 5 illustrates a perspective drawing of a directed sound implementation in a commercial retail environment wherein the parametric speaker is positioned other than overhead with respect to patron 402. In such embodiments, sound may be directed, from parametric speaker 104, toward head 502 of patron 402. Height detector 516 may include a camera, thermal imaging camera, image-based laser sensor, touchless stadiometer, etc., and attendant software/firmware for determining the height of patron 402. Such measurements may be made, for instance, with reference to floor 411. Controller 518, which may also be programmed with computer code to carry out specific functions, may cause sound from parametric speaker 104 to be aimed at head 502 in connection with height detection measurements by height detector 516. More specifically, controller 518 may cause sound from parametric speaker 104 to be aimed at the auditory areas (e.g., ears) of patron 402.

Figure 6:
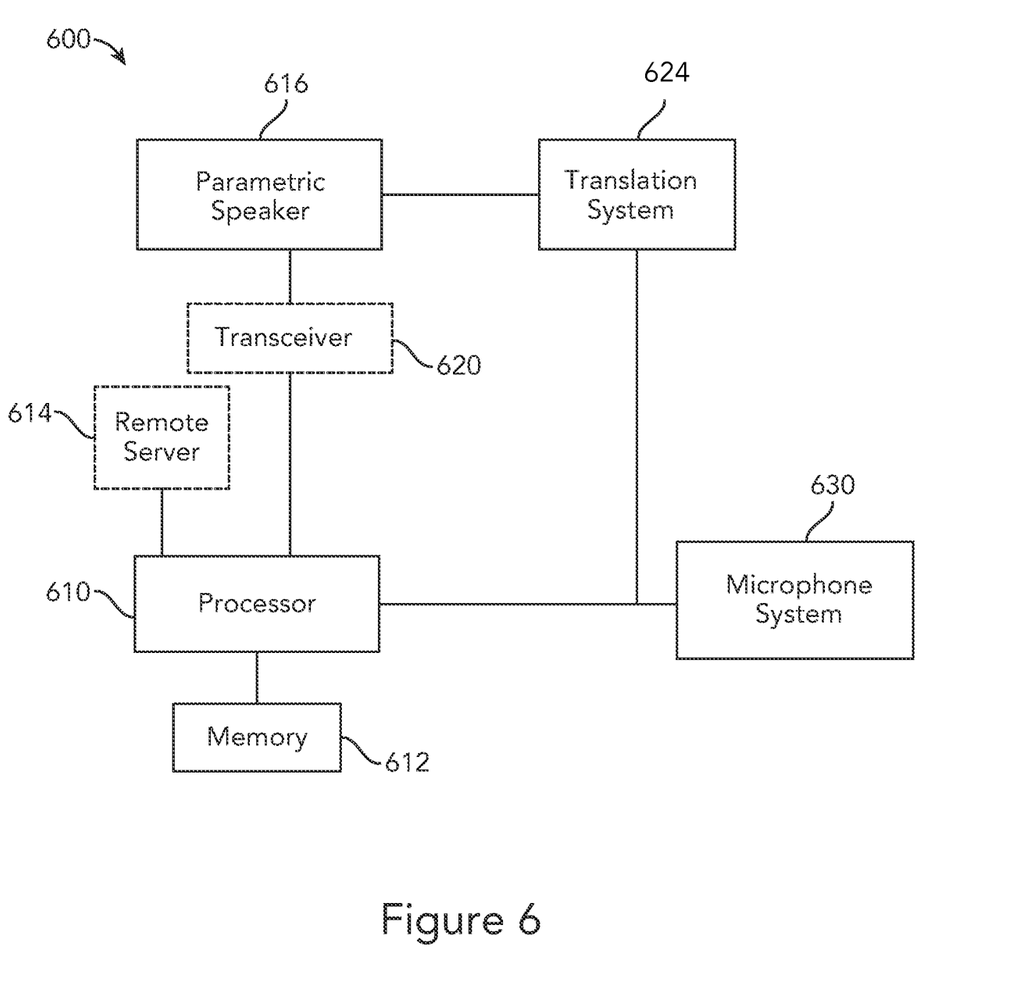
FIG. 6 illustrates a block diagram according to the directed sound system herein.

FIG. 6 illustrates a block diagram according to embodiments disclosed of the directed sound system 600 herein. Processor 610 may be programmed according to software/firmware to control directed sound system 600. In some embodiments, the processor 610 may represent a microcontroller or be part of a microcomputer. Information directed toward individuals, including synthesized sound, may be generated by processor 610 or by processor 610 in conjunction with information stored in memory 612. This way, processor 610 may additionally provide a sound synthesizer function.

Further, processor 610 may contain hardware or software for providing speech synthesis in connection with messages directed over directed sound system 600. Server 614 (which may be accessed remotely) may optionally be provided (as indicated by the dashed lines). Server 614 may contain information for controlling directed sound system 600 and/or include sounding messages over parametric speaker 616. Transceiver 620, which may be a separate transmitter and receiver, is optionally coupled to parametric speaker 616. This enables parametric speaker 616 to receive information wirelessly. Parametric speaker 616 may contain equipment to receive and demodulate received information. In this regard, the reception of a variety of modulated signals is contemplated, including radio frequency (rf) signals, cellular radio signals, infra-red signals, etc. Translation system 624 may be coupled to parametric speaker 616. Translation system 624 may contain the components, systems, devices necessary to carry out interpretation/translation of information for the embodiments and examples described herein. Microphone system 630 may be included in directed sound system 600 for connection to, for instance, processor 610 and translation system 624. Microphone system 630 may facilitate interactive communication among patrons, attendees, users, systems, commercial establishes, as disclosed herein, as the case may be.

Figure 7:
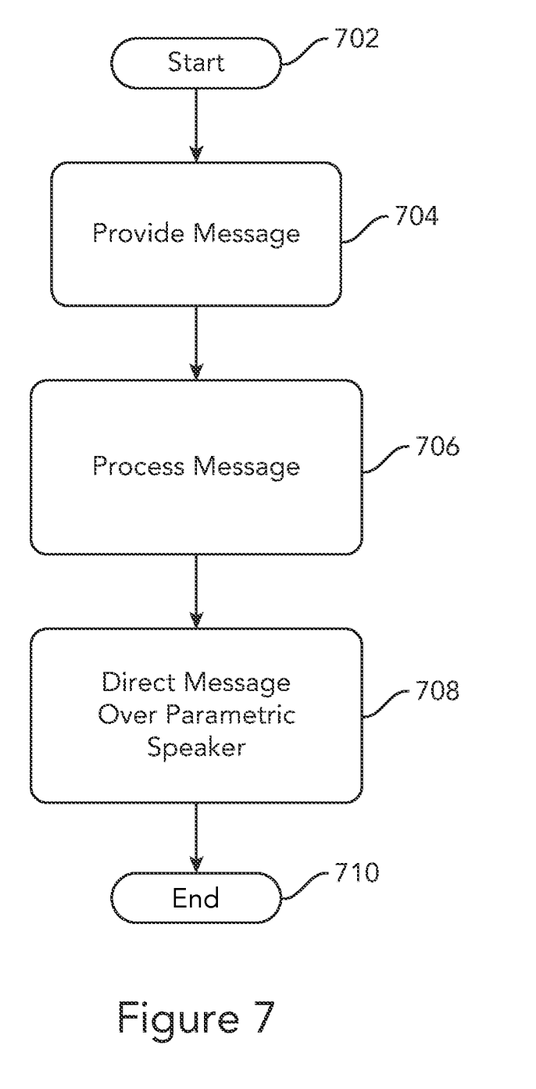
FIG. 7 is a flowchart detailing the basic operational process of the directed sound system.

FIG. 7 is a flowchart detailing the basic operational process of the directed sound system disclosed herein. From the start 702, a message is provided 704, whether by modulated rf or otherwise. The message is processed at step 706. This may include necessary translations, interpretations, etc. At step 708, the message is directed to an intended subject, patron, attendee, etc. The process ends at step 710.

Further, various technologies may be used to provide communication between the various processors and/or memories that may be present within the preceding devices/systems. Various technologies may also allow the processors and/or the memories of the preceding to communicate with any other entity, i.e., to obtain further instructions to access and use remote memory stores, for example. Such technologies used to provide such communication might include a network, the Internet, Intranet, Extranet, LAN, an Ethernet, wireless communication via cell tower or satellite, or any client-server system that provides communication, for example. Such communications technologies may use any suitable protocol such as TCP/IP, UDP, or OSI.

As described above, a set of instructions may be used in the processing of the foregoing. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the foregoing may be in a suitable form such that the processing machine may read the instructions. For example, the instructions that form a program may be in the form of a suitable programming language, which is converted to machine language or object code to allow the processor or processors to read the instructions. That is, written lines of programming code or source code in a particular programming language are converted to machine language using a compiler, assembler, or interpreter. The machine language is binary coded machine instructions specific to a specific processing machine, i.e., a particular computer type. The computer understands the machine language.

The various embodiments of the preceding may use any suitable programming language. Illustratively, the programming language may include assembly language, Ada, APL, Basic, C, C++, COBOL, dBase, Forth, Fortran, Java, Modula-2, Pascal, Prolog, REXX, Visual Basic, and/or JavaScript, for example. Further, a single type of instruction or single programming language doesn't need to be utilized in conjunction with the operation of the system and method of the foregoing. Rather, any number of different programming languages may be used as is necessary and/or desirable.

Also, the instructions and/or data used or accessed by software in the foregoing practice may utilize any compression or encryption technique or algorithm, as desired. An encryption module might be used to encrypt data. Further, files or other data may be decrypted using a suitable decryption module, for example.

As described above, the foregoing may illustratively be embodied in the form of a processing machine, including a computer or computer system, for example, that includes at least one memory. It is to be appreciated that the set of instructions, i.e., the software, for example, that enables the computer operating system to perform the operations described above, may be contained on any of a wide variety of media or mediums, as desired. Further, the information/data processed by the set of instructions might also be contained on a wide variety of media or mediums. That is, the particular medium, i.e., the memory in the processing machine, utilized to hold the set of instructions and/or the data used in the foregoing may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmissions, as well as any other medium or source of data that the processors of the foregoing may read.

Further, the memory or memories used in the processing machine that implements the foregoing may be in a wide variety of forms to allow the memory to hold instructions, data, or other information, as desired. Thus, the memory might be in the form of a database to store data. For example, the database might use any desired arrangement of files, such as a flat-file arrangement or a relational database arrangement.

In the system and method of the preceding, a variety of "user interfaces" may allow a user to interface with the processing machine or machines used to implement the foregoing. As used herein, a user interface includes any hardware, software, or combination of hardware and software used by the processing machine that allows a user to interact with the processing machine. A user interface may be in the form of a dialogue screen, for example. A user interface may also include any of a mouse, actuator, touch screen, keyboard, keypad, voice reader, voice recognizer, dialogue screen, menu box, list, checkbox, toggle switch, a pushbutton, or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface that may be used by the processing machine that performs a set of instructions such that the processing machine processes data for a user. The processing machine typically uses the user interface for interacting with a user to convey or receive information from the user. However, it should be appreciated that in accordance with some embodiments of the system and method of the preceding, a human user doesn't need to interact with a user interface used by the processing machine of the foregoing. Rather, it is also contemplated that the foregoing user interface might interact, i.e., convey and receive information, with another processing machine rather than a human user. Accordingly, the other processing machine might be characterized as a user. Further, it is contemplated that a user interface utilized in the system and method of the foregoing may interact partially with another processing machine or processing machines while also interacting partially with a human user.

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain.

The various features and processes described above may be used independently of one another or combined in various ways. All possible combinations and subcombinations are intended to fall within the scope of this disclosure. In addition, certain methods, events, states, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, parallel, or some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

The term "adjacent" is used to mean "next to or adjoining." For example, the disclosure includes "the at least one directed sound source is located adjacent a head of the user." In this context, "adjacent a head of the user" means that at least one directed sound source is located next to the user's head. The placement of the at least one directed sound source in a ceiling above the user's head, such as in a vehicle ceiling, would fall under the meaning of "adjacent" as used in this disclosure.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in various forms; furthermore, various omissions, substitutions, and changes in the form of the methods and systems described herein may be made without departing from the spirit of the spirit the inventions disclosed herein.

What is claimed is:

1. A method for communications, comprising:
   detecting a subject in an area;
   modulating a message on an ultrasonic carrier to produce a modulated ultrasonic carrier;
   directing the modulated ultrasonic carrier, through a parametric speaker, to the subject; and
   determining a height dimension of the subject relative to a floor;
   wherein the modulated ultrasonic carrier is directed at a region near a farthest extent of the height dimension from the floor.

2. A system, comprising:
   a parametric speaker;

a modulator configured to modulate a message on an ultrasonic carrier resulting in a modulated ultrasonic carrier;

a processor programmed to cause the parametric speaker to direct the modulated ultrasonic carrier to a subject;

a proximity detector configured to detect the subject; and a height detector for detecting a height dimension for the subject in connection with directing the modulated ultrasonic carrier.

3. The system of claim 2, wherein the proximity detector is activated in connection with activating a switch while the subject is within proximity to the system.

4. The system of claim 3, wherein the switch includes a subject-activated button.

5. The system of claim 2, further comprising a memory coupled to the processor.

6. The system of claim 2, wherein the system includes a demodulator.

7. The system of claim 6, wherein the demodulator is configured to demodulate a radio frequency modulated carrier signal.

8. The system of claim 2, wherein the proximity detector includes a camera.

9. The system of claim 2, wherein the processor forms part of a microcontroller.

10. The system of claim 2, wherein the processor forms part of a microcomputer.

11. The system of claim 2, further comprising an interpreter/translator configured to interpret/translate a message from a first language to a second language.

12. The system of claim 2, further comprising a microphone coupled to the system.

13. The system of claim 12, further comprising a voice synthesizer coupled to the system.

14. The system of claim 2, further comprising a receiver, the receiver being operable to receive wireless signals from a group consisting of radiofrequency (rf) signals, infrared signals, microwave signals, and a combination thereof.

15. The system of claim 2, wherein the height detector includes a camera.

16. The system of claim 2, wherein the height detector includes a thermal imaging camera.

17. The system of claim 2, wherein the height detector includes an image-based laser sensor.

18. The system of claim 2, wherein the height detector includes a touchless stadiometer.

19. The system of claim 2, further comprising a transceiver, coupled to the parametric speaker, the transceiver being configured to receive information, wirelessly.

20. The system of claim 19, further comprising a translation system coupled to the parametric speaker.

* * * * *